United States Patent
Park et al.

(10) Patent No.: US 8,848,915 B2
(45) Date of Patent: Sep. 30, 2014

(54) METHOD FOR AUTOMATIC WLAN CONNECTION BETWEEN DIGITAL DEVICES AND DIGITAL DEVICE THEREFOR

(75) Inventors: Woo-Jin Park, Hwaseong-si (KR); Jin-Hyoung Kim, Hwaseong-si (KR); Jin-Wook Lee, Yongin-si (KR); Je-Hyok Ryu, Suwon-si (KR); Hun Lim, Gyeonggi-do (KR); Shin-Il Kang, Suwon-si (KR); Gene-Moo Lee, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 329 days.

(21) Appl. No.: 12/797,225

(22) Filed: Jun. 9, 2010

(65) Prior Publication Data

US 2010/0325425 A1 Dec. 23, 2010

(30) Foreign Application Priority Data

Jun. 18, 2009 (KR) ........................ 10-2009-0054523

(51) Int. Cl.
*H04L 9/00* (2006.01)
*H04L 9/08* (2006.01)
*H04W 12/04* (2009.01)
*H04W 84/18* (2009.01)

(52) U.S. Cl.
CPC ............. *H04W 12/04* (2013.01); *H04L 9/0869* (2013.01); *H04L 2209/80* (2013.01); *H04W 84/18* (2013.01)
USPC ............ 380/270; 713/168; 380/260; 380/262

(58) Field of Classification Search
CPC ..... H04W 24/02; H04W 12/04; H04W 84/18; H04L 12/2424; H04L 2209/80; H04L 9/0869
USPC .................. 713/168, 155; 380/270, 260, 262
See application file for complete search history.

(56) References Cited

U.S. PATENT DOCUMENTS

| 6,167,261 A * | 12/2000 | Amin ......................... 455/426.1 |
| 6,931,132 B2 * | 8/2005 | Billhartz et al. ............. 380/280 |
| 7,263,070 B1 * | 8/2007 | Delker et al. ................. 370/254 |

(Continued)

FOREIGN PATENT DOCUMENTS

| EP | 1603289 A1 * | 12/2005 |
| KR | 1020100092828 | 8/2010 |

OTHER PUBLICATIONS

Cheshire et al., "Dynamic Configuration of IPv4 Link-Local Addresses", Network Working Group, Standards Track, May 2005.

(Continued)

*Primary Examiner* — Jung Kim
*Assistant Examiner* — Thomas Ho
(74) *Attorney, Agent, or Firm* — The Farrell Law Firm, P.C.

(57) ABSTRACT

A method and apparatus for performing an automatic wireless connection with a second digital device by a first digital device is provided. The method includes acquiring, by the first input device, random information used for the wireless connection; checking a status of a Wireless Local Area Network (WLAN); storing the checked status; setting the WLAN to an Ad-hoc mode; setting a Service Set Identifier (SSID) of the WLAN using the random information; setting a security key of the WLAN using the random information; and setting an Internet Protocol (IP) address of the WLAN using the random information.

16 Claims, 7 Drawing Sheets

(56) References Cited

U.S. PATENT DOCUMENTS

| | | | |
|---|---|---|---|
| 7,313,111 B2* | 12/2007 | Hietalahti et al. | 370/329 |
| 7,324,463 B2* | 1/2008 | Takada et al. | 370/259 |
| 7,499,438 B2* | 3/2009 | Hinman et al. | 370/338 |
| 7,941,122 B2* | 5/2011 | Dowek et al. | 455/411 |
| 8,724,813 B2* | 5/2014 | Saboff et al. | 380/270 |
| 2004/0236939 A1* | 11/2004 | Watanabe et al. | 713/150 |
| 2004/0259551 A1* | 12/2004 | Ihori et al. | 455/445 |
| 2006/0023651 A1* | 2/2006 | Tsuchiuchi et al. | 370/310 |
| 2008/0064367 A1* | 3/2008 | Nath et al. | 455/411 |
| 2008/0137860 A1* | 6/2008 | Silvernail | 380/270 |
| 2010/0211785 A1 | 8/2010 | Park et al. | |

OTHER PUBLICATIONS

Rekhter et al., "Address Allocation for Private Internets", Network Working Group, Best Current Practice, Feb. 1996.

Rekhter et al., "An Architecture for IP Address Allocation with CIDR", Network Working Group, Standards Track, Sep. 1993.

* cited by examiner

METHOD FOR AUTOMATIC WLAN CONNECTION BETWEEN DIGITAL DEVICES AND DIGITAL DEVICE THEREFOR

PRIORITY

This application claims priority under 35 U.S.C. §119(a) to a Korean Patent Application filed in the Korean Intellectual Property Office on Jun. 18, 2009 and assigned Serial No. 10-2009-0054523, the entire content of which is incorporated herein by reference.

BACKGROUND OF THE INVENTION

1. Field of the Invention

The present invention relates generally to a method for wireless connection between digital devices, and more particularly, to a method for automatically connecting a Wireless Local Area Network (WLAN) between digital devices, for allowing a user to conveniently use a WLAN, and a digital device therefor.

2. Description of the Related Art

Unlike a wired LAN, which connects devices via conventional cables for communication, WLAN communication is performed through use of a radio frequency. WLAN communication modes include an infrastructure mode and an Ad-hoc mode. Infrastructure mode communication is performed over a connection between an Access Point (AP) and at least one client. Ad-hoc mode communication is performed over a direct connection between clients. Ad-hoc mode enables communication between digital devices that have WLAN interfaces but do not support an AP function.

In order to perform an Ad-hoc mode WLAN connection, a Service Set Identifier (SSID) and a security key for authentication and encryption are required, and an Internet Protocol (IP) address must be set for IP communication. In an Ad-hoc mode WLAN connection process, an SSID setting process and a security setting process are required. In the SSID setting process, since WLAN is used when several devices perform communication based on Carrier Sense Multiple Access/Collision Avoidance (CSMA/CA) by sharing a particular physical frequency band, an SSID is used to distinguish a network in the physical channel. More specifically, the SSID is an identifier used to distinguish between logical WLAN networks in a physical channel, which enables communication between nodes having the same SSIDs (e.g., between an AP and a client, or between clients with the same SSIDs). In order for certain nodes to communicate with each other using WLAN, each node must have the same SSID information.

WLAN communications are more vulnerable to security breaches than conventional wired networks, because WLAN communication includes wireless communication using a particular frequency. Therefore, in contrast to Wired LAN communication, authentication and encryption are often required. A WLAN authentication process includes allowing an authorized node or user to access WLAN, and is used to require transmitting and receiving nodes to encrypt data in a predetermined manner during communication, so that other nodes are prohibited from accessing data transmitted during the communication. In the Ad-hoc mode, open authentication and shared authentication are available, and authentication and encryption are performed according to a Wired Equivalent Privacy (WEP) standard. In order for certain nodes to communicate with each other using WLAN communication, each participating node uses the same authentication and encryption scheme. In Ah-hoc communications in particular, a WEP key is required.

In an IP address setting process, since WLAN communication uses a link layer of Layer 2 (L2) in an Open System Interconnection reference model (OSI) 7 layer, an IP address must be set in a WLAN interface for actual IP communication in Layer 3 (L3), which is the network layer. Generally, nodes participating in one broadcast domain must use IP addresses belonging to the same subnet for IP communication, and the IP should be unique within the broadcast domain. Each node can have multiple LAN cards or interfaces and multiple IPs, and each IP can belong to a different subnet.

A setting and connection procedure for performing a WLAN connection is described as follows with reference to FIG. 1. In step 100, a user checks a status of a WLAN and activates a WLAN interface, if the WLAN interface has not already been activated. If the user selects an Ad-hoc mode in step 105, the WLAN is set to the Ad-hoc mode in step 110. If the user inputs an SSID of the WLAN in step 115, the SSID of the WLAN is set in step 120. If the user inputs a security key of the WLAN in step 125, the security key of WLAN is set in step 130. If the user inputs an IP address in step 135, the IP address of the WLAN is set in step 140, and Ad-hoc communication is connected in step 145. As stated above, for in order to perform the WLAN connection, the user must input WLAN settings and connection information in each step.

Status information of a WLAN and activation of the WLAN interface are available through WLAN management software of an Operating System (OS). For example, a WLAN may be turned On/Off through use of the software. Therefore, a user must know how to operate the WLAN management software, and must have knowledge about the status of the WLAN interface. The user must also set the Ad-hoc mode, the SSID, and the WEP key using the WLAN management software of the OS. Generally, in order to set WLAN to the Ad-hoc mode and to input the SSID and the WEP key, the user must run the WLAN management software and then re-select an SSID and WEP setting menu and set the SSID and the WEP key on an input window within the WLAN management software. In order to set the Ad-hoc mode and to input the SSID and the WEP key, the user must have knowledge about WLAN and know how to operate the WLAN management software.

A node accessing the Internet is generally assigned an IP from a Dynamic Host Configuration Protocol (DHCP) server using DHCP, i.e., the user uses an IP without directly setting the IP. By contrast, in Ad-hoc WLAN connection, an IP address must be directly set in a WLAN interface without using DHCP. Therefore, in order to set an IP address, the user must have knowledge about the IP address system and know how to operate IP address management software.

As described above, in order to set up a WLAN connection, the user must know how to use WLAN and IP address management software and have general knowledge about WLAN and IP. Using WLAN communication may be complicated for users who have no knowledge about WLAN and IP, or are unfamiliar with use of WLAN and IP address management software. However, the above-described information is not the information that the user must know in order to perform communication using an application connected to a WLAN, and the user's main purpose is to use the application after a WLAN connection has already been established. Accordingly, it is inefficient to require a user to input various information items for setting up a WLAN one at a time, which is very inconvenient for users who must often change WLAN settings due to frequent movement amongst various WLAN networks.

SUMMARY OF THE INVENTION

An object of the present invention is to address at least the above-mentioned problems and/or disadvantages and to provide at least the advantages described below. Accordingly, an aspect of the present invention provides a method for allowing a user to automatically connect WLAN between digital devices without directly inputting an SSID, a security key and an IP address for WLAN communication between the digital devices having WLAN interfaces, and a digital device therefor.

In accordance with one aspect of the present invention, there is provided a method for performing an automatic wireless connection with at least one second digital device by a first digital device. The method includes acquiring, by the first input device, random information used for the wireless connection; checking a status of a Wireless Local Area Network (WLAN); storing the checked status; setting the WLAN to an Ad-hoc mode; setting a Service Set Identifier (SSID) of the WLAN using the random information; setting a security key of the WLAN using the random information; and setting an Internet Protocol (IP) address of the WLAN using the random information.

In accordance with one aspect of the present invention, there is provided a first digital device for performing an automatic wireless connection with a second digital device, in which a random number acquirer acquires random information used in common for the wireless connection, a status checker checks and stores a status of a WLAN and sets the WLAN to an Ad-hoc mode, and a setter sets an SSID, a security key, and an IP address of the WLAN using the random information.

BRIEF DESCRIPTION OF THE DRAWINGS

The above and other aspects, features and advantages of certain embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EMBODIMENTS

Figure 1:
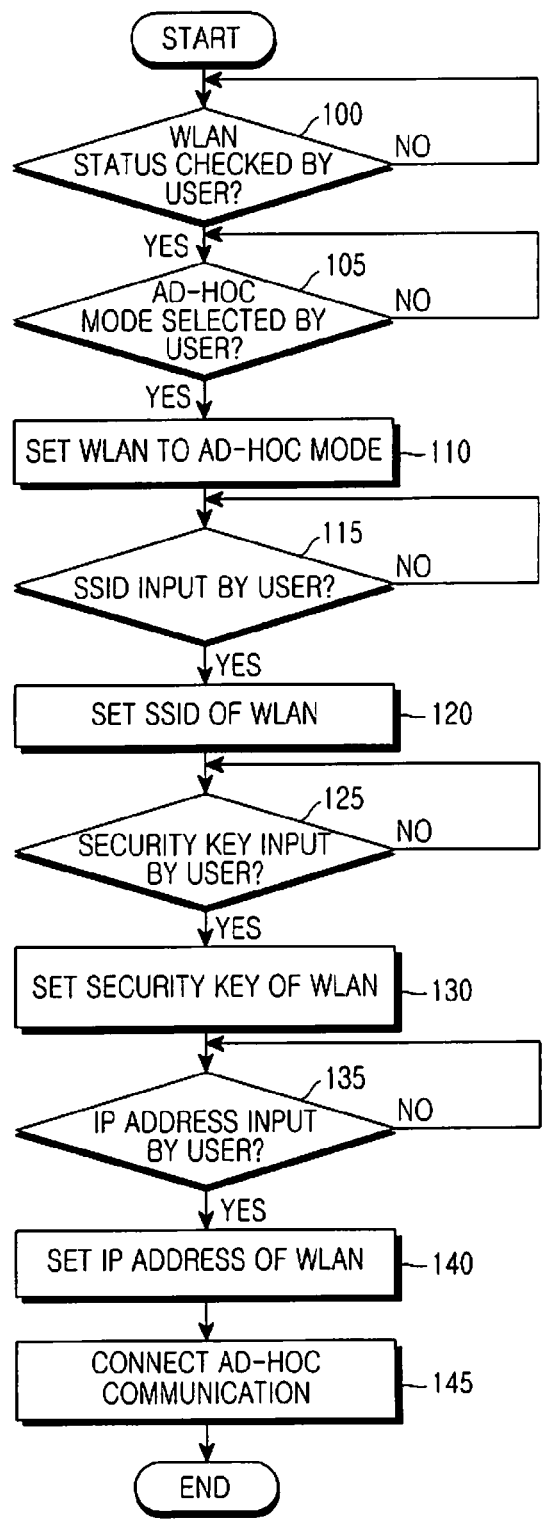
FIG. 1 is a flowchart illustrating the conventional setting and connection procedure for WLAN connection.

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

A method according to an embodiment of the present invention includes automatically connecting a WLAN between digital devices having WLAN interfaces without requiring a user to directly input an SSID, a security key and an IP address for WLAN communication. To perform this method, an SSID, a security key and an IP address are automatically generated between digital devices using the same information, and according to an embodiment of the present invention, random information is used as the same information shared between the digital devices. The random information may be a random number that is generated at random in any one digital device. By doing so, the user may conveniently use a WLAN without inputting respective information for WLAN connection each time the attempts connecting to the WLAN. A digital device according to an embodiment of the present invention may have enhanced security features due to characteristics of the random information that change upon each connection attempt.

A detailed connection procedure performed in each digital device according to an embodiment of the present invention is described herein based on an assumption that a random number is used as random information. The connection procedure is described separately for each of a first digital device and a second digital device. The first digital device generates and displays a random number, and automatically generates an SSID, a security key and an IP address using the generated random number. The second digital device receives the random number displayed on the first digital device from a user, and automatically generates an SSID, a security key and an IP address, similarly to the first digital device, thereby performing a WLAN connection with the first digital device. A method according to an embodiment of the present invention includes automatically generating and setting all information necessary for wireless connection by automatically generating a random number, thus enabling WLAN communication even in a digital device without input means. According to the method, only one of the two digital devices may have input means for inputting the random number.

An automatic WLAN connection procedure between first and second digital devices using a random number according to an embodiment of the present invention is described as follows with reference to FIG. 2.

Figure 2:
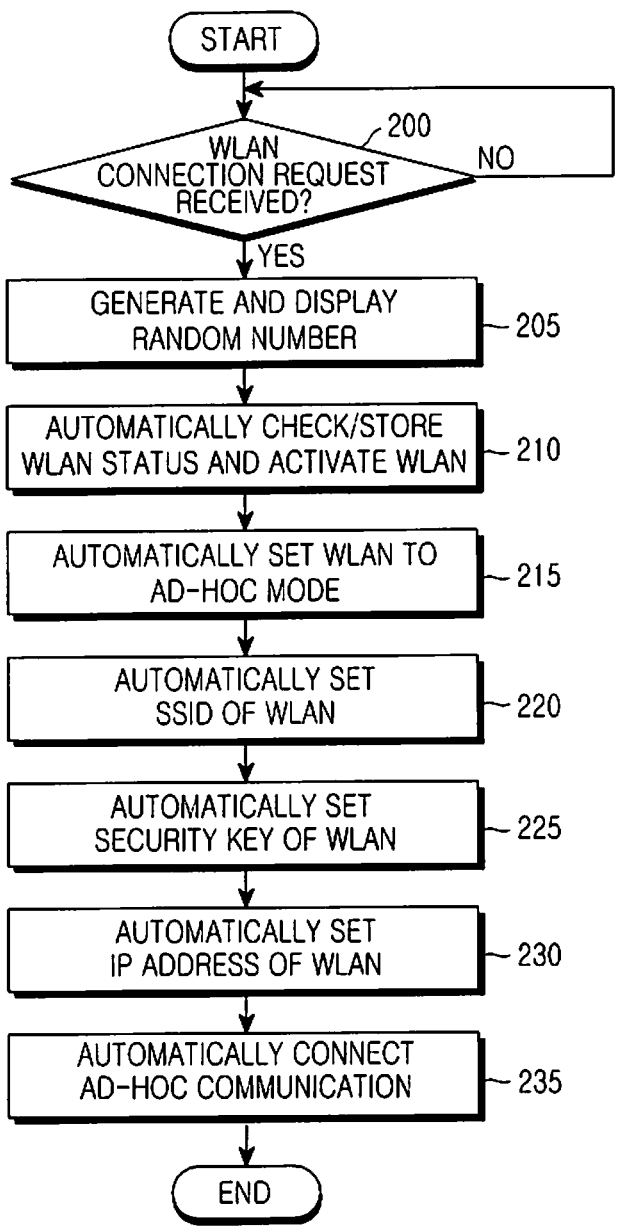
FIG. 2 is a flowchart illustrating an automatic WLAN connection procedure in a first digital device according to an embodiment of the present invention.

Referring to FIG. 2, the first digital device determines whether a WLAN connection request is received, in step 200. An automatic WLAN connection procedure in the first digital device is initiated by, for example, receiving input of a click of a WLAN Connection Button from a user. Initiating the WLAN connection includes attempting an automatic wireless connection with the second digital device. Unlike the above-described method, this operation of initiating the WLAN connection may be initiated as the user boots the digital device, so that an application for automatic connection will automatically run after booting is completed. The automatic WLAN connection operation may also be initiated when reconnection is attempted after a previous connection with the second digital device has been terminated by the second digital device.

As described above, upon booting of the first digital device, wireless connection software automatically runs and sets information necessary for performing a WLAN connection. The necessary information includes an SSID, an IP address, and a security key, which allow the other party's digital device to find the SSID and perform the WLAN connection. However, a user of the other party's digital device inputs the information necessary for WLAN connection. If the SSID is fixed when the software sets information for performing a WLAN connection, such that the software automatically runs upon booting a device, the software itself must change in order to change the SSID. Because the SSID is public within a WLAN coverage area when a SSID is fixed, WLAN communication attempts of a specific digital device may be more easily exposed to other users within the WLAN coverage area than in a situation where the SSID changes upon each connection. Considering this difference in security, embodiments of the present invention are described herein with respect to cases where the SSID of the pertinent digital device changes upon each WLAN connection, so that WLAN communication attempts of digital devices may not be exposed.

To perform the WLAN connection procedure, the first digital device generates a random number and displays the generated random number on its display, in step 205. The same random number is used in both the first and second digital devices for the automatic wireless connection. In step 210, the first digital device automatically checks and stores a status of a WLAN, which includes, for example, an On/Off status, an SSID, a security key and an IP address, and activates the WLAN to the On-status, if the WLAN is in an Off-status. Information including the WLAN's status may be used later when the second digital device attempts a reconnection. By storing the information used for connection within the second digital device, the same information previously used may be used again during the future reconnections, facilitating simplified reconnections. In step 215, the first digital device automatically sets the WLAN to an Ad-hoc mode. In step 220, the first digital device automatically sets an SSID of WLAN using the random number generated in step 205. In step 225, the first digital device also automatically sets a security key for WLAN using the random number. The first digital device also automatically sets an IP address of WLAN using the acquired random number in step 230. The process of setting the SSID, the security key and the IP address using the random number is described in detail herein below. Based on the automatically set values, automatic Ad-hoc wireless communication with the second digital device is performed in step 235.

Since the first digital device only needs to display the generated input random number in order to inform the use the number, the first digital device does not require a separate input means for performing the WLAN connection. Accordingly, a WLAN connection is possible for the first digital device that has a WLAN interface and includes only display means without requiring input means other than input means for initiating the WLAN connection procedure, for example, as described hereinabove.

As described above, the first digital device with a WLAN interface may automatically connect with the second digital device, even if the user provides a single input for a connection request, for example, by clicking a WLAN Connection Button without directly inputting an SSID, a security key and an IP address. In addition, if the user of the first digital device boots the first digital device and an application for automatic wireless connection automatically runs after completion of the booting, the first digital device may automatically wait for the second digital device to connect without further input of another connection request through clicking the WLAN Connection Button, and may automatically complete the connection upon a connection request of the second digital device. Accordingly, the user may conveniently use WLAN without an understanding of how to use complicated WLAN and IP address management software.

Figure 3:
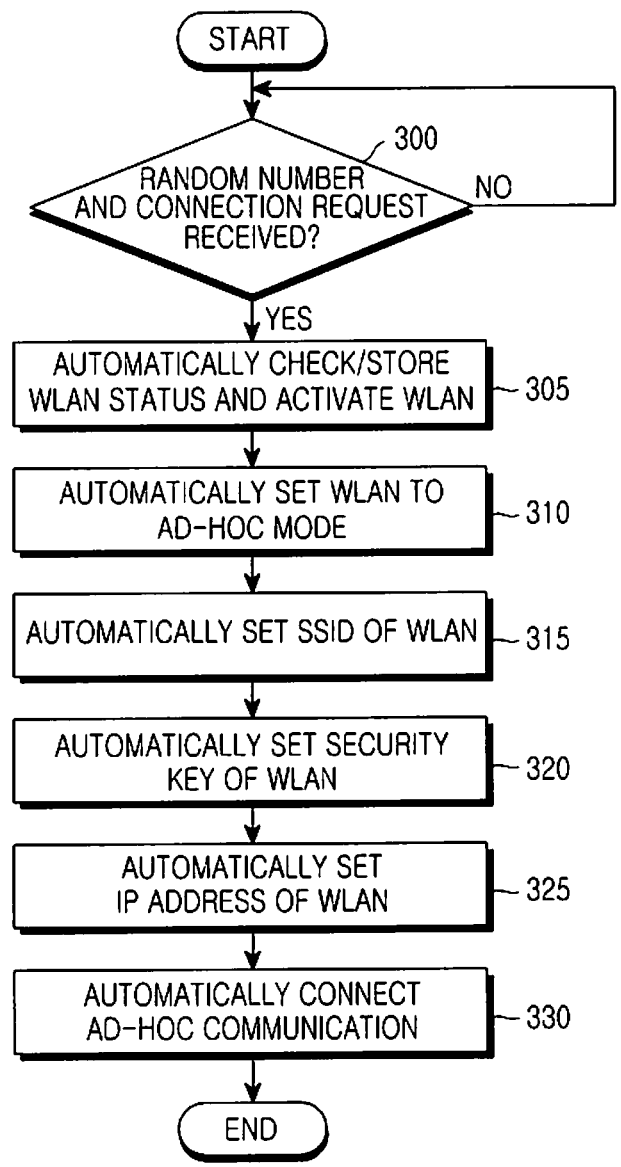
FIG. 3 is a flowchart illustrating an automatic WLAN connection procedure in a second digital device according to an embodiment of the present invention.

An automatic WLAN connection procedure performed in the second digital device according to an embodiment of the present invention is illustrated in FIG. 3. Unlike the first digital device, the second digital device has other input means, because the second digital device receives the random number generated in the first digital device. Referring to FIG. 3, if a random number displayed on the first digital device attempting to connect with the second digital device is received as a user input and a WLAN Connection Button is clicked in step 300, a WLAN connection procedure is initiated. After the initiation of the connection procedure, steps 305 to 330, which are performed in the same manner for both the first and second digital devices, are identical in operation to steps 210 to 235 of FIG. 2, so a description thereof is omitted for clarity and conciseness.

As described above, user input of the random number, for example, is requested only in one digital device and the other information necessary for wireless connection is automatically handled, thus increasing the speed of performing a connection. In addition, a wireless connection according to an embodiment of the present invention is available even in a digital device without an input means, thereby increasing a number of applications that can use wireless connections between various digital devices.

Figure 4:
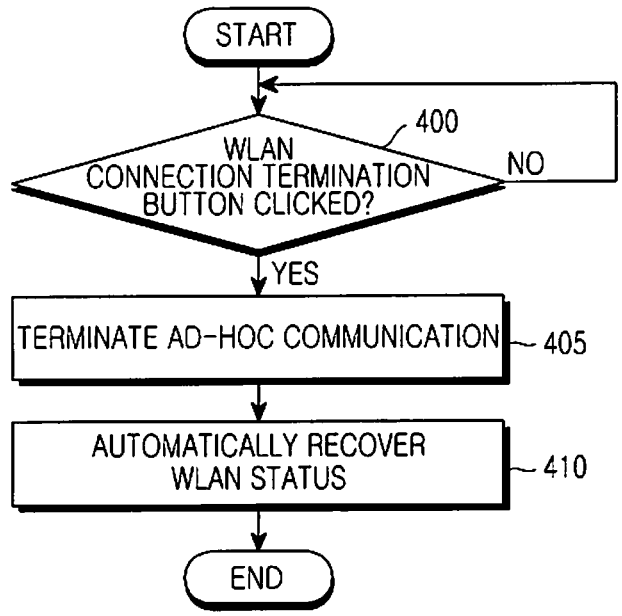
FIG. 4 is a flowchart illustrating an automatic WLAN connection termination procedure in first and second digital devices according to an embodiment of the present invention.

An automatic WLAN connection termination procedure between first and second digital devices is described as follows with reference to FIG. 4. The automatic WLAN connection may be terminated by performing a connection termination in any one of the two digital devices. A WLAN connection between a digital device with an input unit and a digital device without an input unit is preferably terminated by the digital device with an input unit.

The automatic WLAN connection termination procedure in the second digital device is initiated by receiving a user input of a clicking of a WLAN Connection Termination Button in the second digital device, in step 400. Upon receiving the input, the second digital device automatically terminates Ad-hoc communication, in step 405. Otherwise, the termination procedure may be initiated by powering off or removal of a dedicated connector, thereby automatically terminating the Ad-hoc communication. During the termination of the Ad-hoc communication, the second digital device deletes the information generated for communication connection with the first digital device. The deleted information may include, for example, the SSID, the security key and the IP address. In step 410, the second digital device recovers the WLAN's status that was stored during automatic WLAN connection. If the WLAN's status is recovered, reconnection with another digital device that was previously connected is also possible. An automatic WLAN connection termination procedure in the first digital device with input means is also performed as described above.

As in FIGS. 2 and 3, the connection procedures in the first and second digital devices are identical except for an operation of acquiring a random number. A structure of the first and second digital devices is described as follows with reference to FIG. 8. A random number acquirer 800 for acquiring a random number in the first and second digital devices is described as follows.

Figure 8:
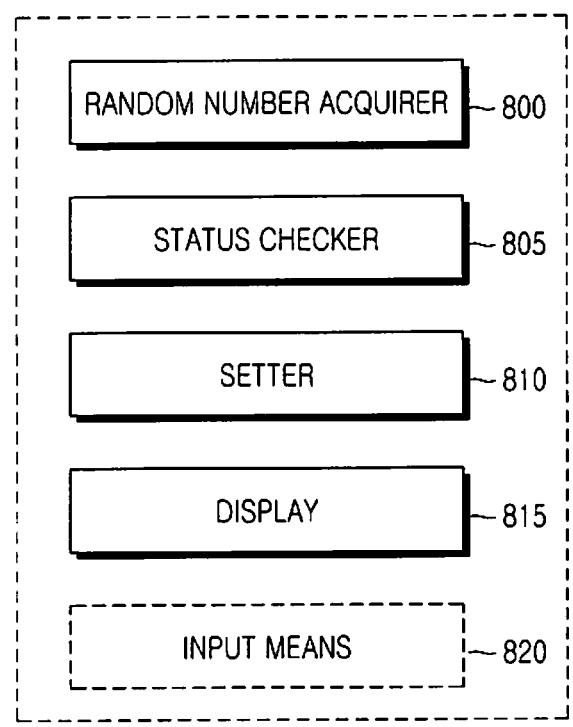
FIG. 8 is a diagram illustrating a structure of a digital device according to an embodiment of the present invention.

Referring to FIG. 8, the random number acquirer 800 in the first digital device generates a random number upon receipt of a start request for the automatic WLAN connection procedure, and the random number from the random number acquirer 800 is displayed on a display 815. An input means 820 is not mandatory in the first digital device. However, the random number acquirer 800 in the second digital device acquires a random number by receiving random information displayed on the first digital device from the user. In order to receive the random information, the second digital device requires the input means 820.

The following operation described with reference to FIG. 8 is performed identically in both the first and second digital devices. A status checker 805 for automatically checking/storing a status of a WLAN and activating a WLAN interface, and setting the Ad-hoc mode is the same for both the first and second digital devices, and a setter 810 for setting an SSID, a security key and an IP address are also the same. More specifically, the first digital device checks and stores the current WLAN's status (WLAN On/Off, SSID, security key, and IP address). The status is stored before automatic wireless connection between the first and second digital devices, and then the original status is recovered after a termination of the connection. If the WLAN's status is in an Off-status, WLAN is automatically activated by changing the WLAN's status to an On-status.

Figure 5:
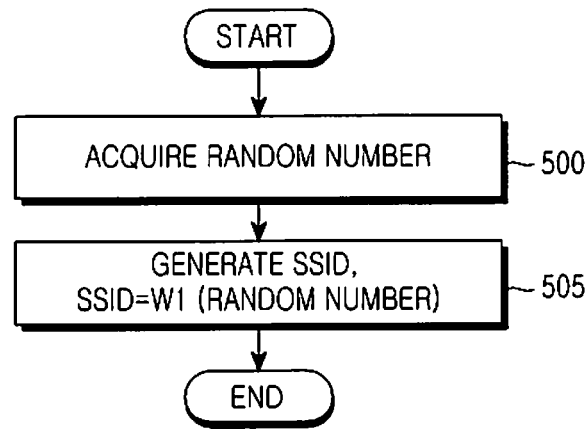
FIG. 5 is a flowchart illustrating an SSID generation process according to an embodiment of the present invention.

The first and second digital devices automatically set WLAN to the Ad-hoc mode, and then automatically set an SSID for the WLAN. The SSID is generated in the same way in the first and second digital devices. Referring to FIG. 5, a random number is acquired in step 500. The first digital device acquires the random number by generating a random number, while the second digital device acquires the random number by receiving a user input of the generated random number. In step 505, an SSID is generated using the acquired random number. For example, a 32-byte SSID is generated by applying a first hash function W1 to the random number. Generally, an SSID is public within WLAN coverage upon each wireless connection of the digital device. According to the present invention, since the SSID changes upon each WLAN connection of a pertinent digital device, WLAN communication attempts of the pertinent digital device is not exposed, ensuring security of the pertinent digital device.

Figure 6:
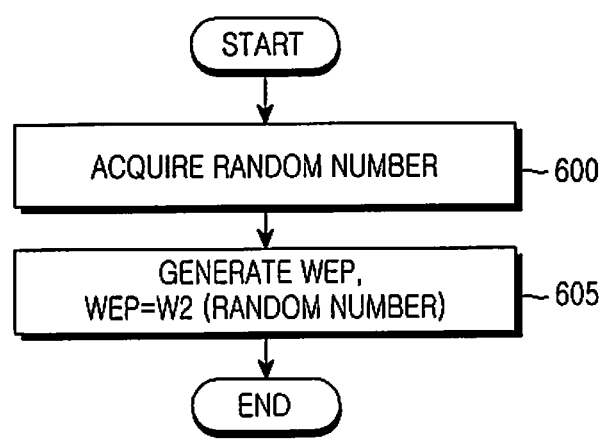
FIG. 6 is a flowchart illustrating a WEP key generation process according to an embodiment of the present invention.

Each of the first and second digital devices also automatically sets a security key for the WLAN. A WEP key is generated in the same manner within both the first and second digital devices. A WEP key generation process according to an embodiment of the present invention is described as follows with reference to FIG. 6. A random number is acquired in step 600, in the same manner as in step 500 of FIG. 5. In step 605, a 13-byte text type WEP key is generated by applying a second hash function W2 to the acquired random number.

After generating the WEP key, the first and second digital devices automatically set IP addresses for the WLAN. The first and second digital devices automatically generate private IP addresses having the same prefixes, and a range of IP addresses that can be assigned as the private IP addresses are as shown in Table 1 below.

TABLE 1

| Class A: | 10.0.0.0~10.255.255.255 (10/8 prefix) |
| Class B: | 172.16.0.0~172.31.255.255 (172.16/12 prefix) |
| Class C: | 192.168.0.0~192.168.255.255 (192.168/16 prefix) |

According to an embodiment of the present invention, a private IP address (Network Part+Host Part) for a wireless connection between the first and second digital devices uses a 24-bit prefix as a network part of the address by applying Classless Inter-Domain Routing (CIDR)[3]. A total of 256 addresses (host part=8 bits) can be assigned to each subnet, but since 0 and 255 are used for other purposes in the host part, an address range of the actually available host part has a total of 254 addresses, ranging from 1 to 254. Eight bits are assigned to the host part, according to embodiments of the present invention, in order to connect up to 254 devices during the final wireless connection between the first and second devices taking into consideration not only a 1:1 connection but also 1:N, N:1 and N:N connections.

A method for generating and setting private IP addresses (Prefix Part+Host Part) of first and second digital devices using a random number is described in detail as follows with reference to FIG. 7.

Figure 7:
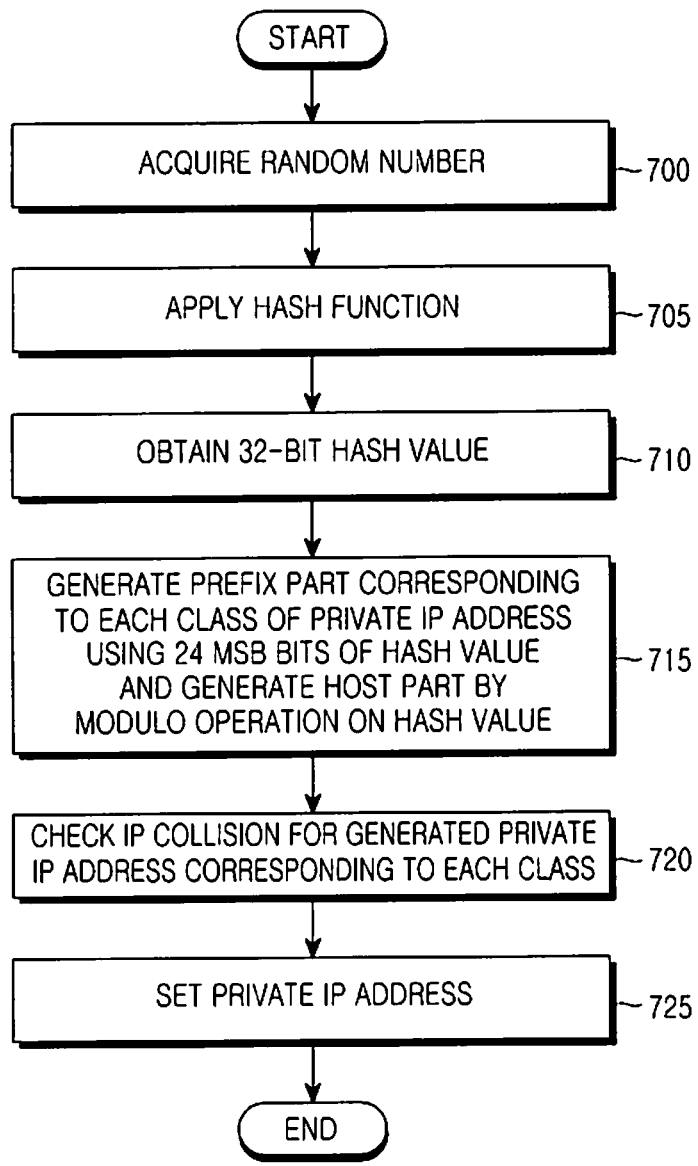
FIG. 7 is a flowchart illustrating generation and setting of a private IP address according to an embodiment of the present invention.

Referring to FIG. 7, if a random number is acquired in step 700, which is acquired in the same manner as in step 500 of FIG. 5, a third hash function is applied to the random number, in step 705, and a 32-bit hash value is obtained through the third hash function, in step 710. In step 715, prefix parts of 3 private IP addresses corresponding to a class A, a class B and a class C are generated using 24 Most Significant Bit (MSB) bits of the 32-bit hash value 'X', and host parts are generated by a modulo operation on the 32-bit hash value. Since the numbers of 1 to 254 excluding 0 and 255 can be used for the host parts, a host part in the first digital device is generated according to the formula X % 254+1, and a host part in the second digital device is generated by subtracting the host part of the first digital device from 255. In the first and second digital devices, private IP addresses are generated in pairs for each of the three classes. Accordingly, the same prefix parts are generated with only the host parts different, and host parts of the other parties can be known.

In step 720, an IP collision checked is conducted for the private IP addresses corresponding to each class, which are generated in the first and second digital devices. The IP collision check is conducted by comparing prefix parts set in different interfaces of the devices with prefix parts of the generated 3 private IP addresses, and if interfaces having the same prefix parts exist in the generated 3 private IP addresses, the IP addresses are deleted.

Since the private IP addresses generated by the other parties are validated by checking for a response to an Internet Control Message Protocol (ICMP) Ping test on the private IP addresses left after the IP collision check in the first and second digital devices, the first and second digital devices each determine and set a private IP address to be used for wireless connection in step 725. Multiple IP addresses may succeed according to responses to the response check on the ICMP Ping test after the IP collision check. In this case, the private IP addresses to be used for wireless connection are determined and set according the class priority of each private IP address.

As is apparent from the foregoing description, according to embodiments of the present invention, a first digital device generate and displays a random number, and terminates a WLAN connection upon a WLAN connection waiting period and connection attempts using the generated random number. However, another digital device performs a WLAN connection by receiving a user input of the random number displayed on the first digital device. WLAN communication according to embodiments of the present invention may be applied to digital devices that have only a display means without input means other than an input that may be necessary for initiating a WLAN connection.

According to embodiments of the present invention, the Wireless Fidelity (WiFi) profile (which includes an SSID, security, etc.) and the IP address required during wireless connection are automatically set, enabling the digital devices to be automatically connected. Therefore, users are not required to have knowledge conventionally required to perform a wireless connection. As user input other than input for initializing a wireless connection is required only in one digital device for a wireless connection between digital devices, wireless connection is possible even without the input means in the other digital device. In addition, the SSID, the security key and the IP address are automatically set at random during each WLAN connection, ensuring high connection speed and efficient security and thus maximizing applications that can be used through wireless connection between the digital devices.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for performing an automatic wireless connection with a second device by a first device, the method comprising:
   generating, by the first device, random information used for the wireless connection;
   displaying the random information on a display of the first device;
   setting, by the first device, a Wireless Local Area Network (WLAN) to an Ad-hoc mode;
   setting, by the first device, a Service Set Identifier (SSID) of the WLAN using the random information;
   setting, by the first device, a security key of the WLAN using the random information;
   setting, by the first device, an Internet Protocol (IP) address of the WLAN using the random information; and
   connecting, by the first device, with the second device using the IP address of the WLAN.

2. The method of claim 1, wherein the random information is generated upon receiving a start request for an automatic WLAN connection procedure, and
   wherein the random information is displayed on the first device so that the random information can be input in the second device.

3. The method of claim 1, wherein the random information is a random number.

4. The method of claim 1, wherein the setting an SSID of the WLAN comprises generating a 32-byte SSID by applying a first hash function to the random information.

5. The method of claim 1, wherein the setting a security key of the WLAN comprises generating a 13-byte text type Wired Equivalent Privacy (WEP) key by applying a second hash function to the random information.

6. The method of claim 1, wherein the setting an IP address for the WLAN comprises:
   generating a 32-bit hash value by applying a third hash function to the random information;
   generating a prefix part and a host part corresponding to each class of a private IP address using the hash value; and
   checking collision/non-collision of the generated IP address for each class.

7. The method of claim 1, wherein prefix parts generated in the first device are identical to prefix parts generated in the second device, and host parts generated in the first device are different from host parts generated in the second device.

8. A first device for performing an automatic wireless connection with a second device, comprising:
   a random number acquirer for generating random information shared between the first device and the second device for the wireless connection;
   a display for displaying the random information;
   a status checker for setting a Wireless Local Area Network (WLAN) to an Ad-hoc mode; and
   a setter for setting a Service Set Identifier (SSID) using the random information, a security key using the random information, an Internet Protocol (IP) address of the WLAN using the random information, and wirelessly connecting with the second device using the IP address of the WLAN.

9. The first device of claim 8, wherein the random information is generated upon receiving a start request for an automatic WLAN connection procedure.

10. The first device of claim 8, wherein the random information so the random information can be input in the second device.

11. The first device of claim 8, wherein the random information is a random number.

12. The first device of claim 8, wherein the setter generates a 32-byte SSID by applying a first hash function to the random information.

13. The first device of claim 8, wherein the setter generates a 13-byte text type Wired Equivalent Privacy (WEP) key by applying a second hash function to the random information.

14. The first device of claim 8, wherein the setter generates a 32-bit hash value by applying a third hash function to the random information, generates a prefix part and a host part corresponding to each class of a private IP address using the hash value, and checks collision/non-collision of the generated IP address for each class.

15. The first device of claim 14, wherein prefix parts generated in the first device are identical to prefix parts generated in the second device, and host parts generated in the first device are different from host parts generated in the second device.

16. A method for performing an automatic wireless connection with a second device by a first device, the method comprising:
   generating, by the first device, random information shared between the first device and the second device for the wireless connection;
   displaying the random information on a display of the first device;
   automatically setting, by the first device, a Wireless Local Area Network (WLAN) to an Ad-hoc mode;
   automatically generating, by the first device, a Service Set Identifier (SSID) of the WLAN using the random information;
   automatically generating, by the first device, a security key of the WLAN using the random information;
   automatically generating, by the first device, an Internet Protocol (IP) address of the WLAN using the random information; and
   wirelessly connecting, by the first device, to the second device using the IP address of the WLAN.

* * * * *